May 28, 1963  A. W. LOCKWOOD  3,090,962
METHOD OF MAKING SHIRT AND LIKE COLLARS
Filed May 11, 1960
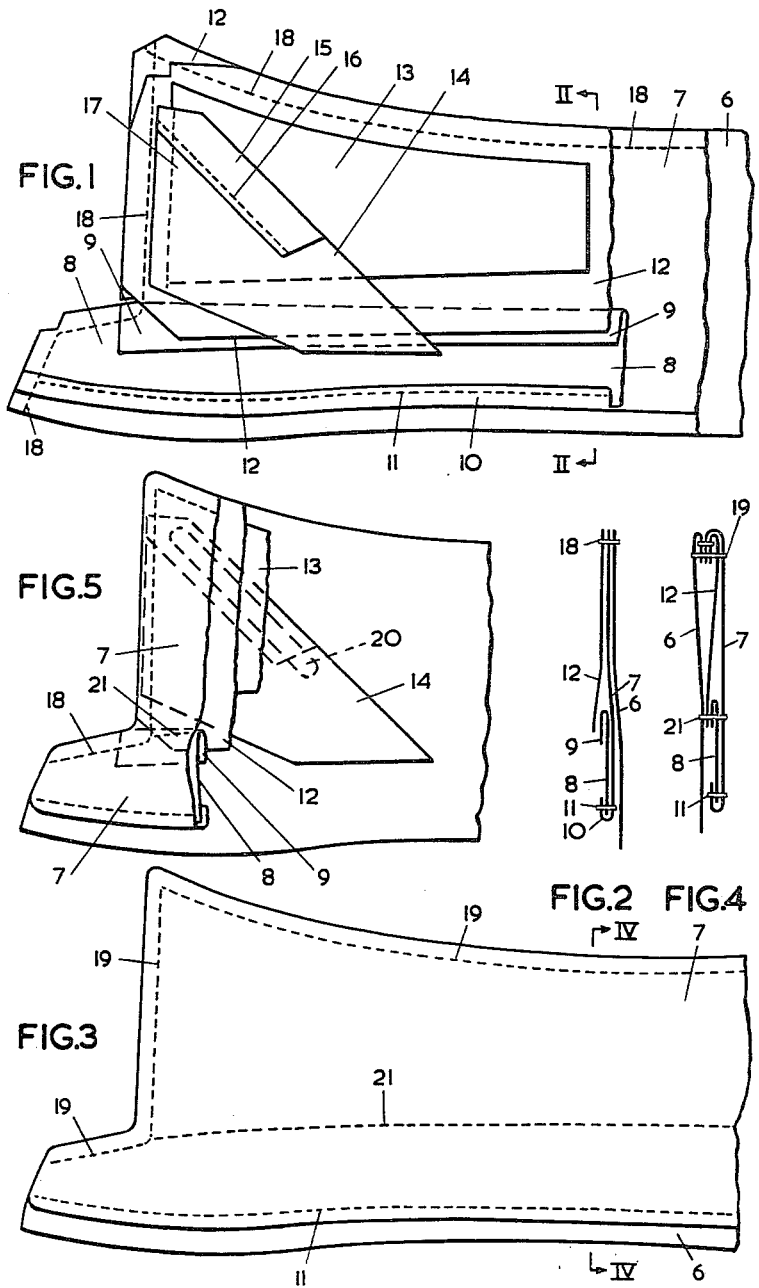
INVENTOR
ARTHUR WILLIAM LOCKWOOD
BY Hane and Hydin
ATTORNEYS United States Patent Office 3,090,962
Patented May 28, 1963

3,090,962
METHOD OF MAKING SHIRT AND LIKE COLLARS
Arthur William Lockwood, London, England, assignor to Trubenised Company (Registered Trust)
Filed May 11, 1960, Ser. No. 28,305
Claims priority, application Great Britain May 19, 1959
3 Claims. (Cl. 2—143)

This invention relates to multi-ply turndown collars for shirts and other garments. While particularly applicable to a collar intended for permanent attachment to the garment, the invention may also be applied to a collar made as a separate article and only detachably secured to the garment.

The invention is concerned with collars whose two outer plies are of one-piece construction, the same piece of fabric extending across the foldline of the collar and forming part both of the outer fold, or collar-top, and of the inner fold, or band, while an intermediate lining ply comprises two separate pieces of fabric which overlap one another along a zone bordering the foldline of the collar. The use of such a split lining has the advantage of allowing lining materials of different weights or characters to be used for the band and the top, so that, for example, the collar may be made with a fused top and a soft band, or vice versa. Moreover, the zone along which the two parts of the lining overlap one another can serve to define the foldline of the collar, eliminating the usual necessity for securing a separate foldline-determining tape to the lining of a one-piece collar.

The invention includes a method of making a collar having one-piece face and back plies and a lining composed of two pieces of fabric overlapping one another along the upper margin of the collar band, characterised in that the two lining pieces are secured in mutually overlapping relation to the face and back plies and the assembly is turned to bring the lining material between the outer plies while the overlapping parts of the lining pieces are still unattached to one another, such attachment being effected by sitching the overlapping parts together and to at least one of the outer plies after the assembly has been turned.

This method of manufacture has the advantage of leaving the face ply free from the stretch which may be caused by turning it over a unitary lining. Since the two parts of the lining are still separate from one another when the collar is turned, they are free to move relatively so as to increase the extent of their overlap, thus avoiding any tendency to stretch the face ply. The method of the invention has the further advantage of allowing the band lining to be sewn to the face ply along the bottom or attaching edge of the band before the collar is run.

Collars made by the method of the invention can be distinguished from previously known collars having one-piece face and back plies and a two-part lining by the fact that the overlapped portions of the lining are joined together only by stitching which also extends through at least one of the outer plies of the collar and are not secured together by any wholly internal stitching. The invention accordingly includes a collar having one-piece face and back plies and a lining composed of two pieces of fabric overlapping one another along the upper margin of the collar band, characterised in that the overlapping parts of the two lining pieces are secured together only by stitching which also passes through at least one of the outer plies of the collar and not by any wholly internal stitching passing only through the two lining pieces.

One particular embodiment of the invention is illustrated by the accompanying drawings and is described in detail below, together with some of the many modifications possible within the scope of the invention, as defined in the appended claims. In the drawing:

FIGURE 1 is a plan view, with parts broken away, of one end of a collar assembly, after it has been run and before it is turned;

FIGURE 2 is a section through the assembly of FIGURE 1, taken on the line II—II.

FIGURE 3 is a plan view of one end of the completed collar;

FIGURE 4 is a section taken on the line IV—IV of FIGURE 3; and

FIGURE 5 is a plan view of one end of the completed collar, with parts broken away to show the internal construction.

The assembly shown in FIGURES 1 and 2 comprises a one-piece back ply 6 and a one-piece face ply 7 of the usual form. Over the band portion of the face ply there is laid a piece of lining fabric 8 whose upper margin is folded over as shown at 9, the folded edge of the piece coinciding with the intended foldline of the collar. The low margin of the face ply 7 is turned up over the lower edge of the lining piece as shown at 10 and secured to it by stitching 11, this attachment of the band lining to the face ply being conveniently effected before the fabrics are assembled to the superimposed relation shown. Over the collar-top portion of the face ply there is laid a second piece of lining fabric 12, whose lower edge extends across the intended foldline and overlaps the band lining 8 along a narrow zone extending the full length of the foldline.

In the collar shown, the collar-top lining 12 has each of its end portions stiffened and reinforced by a patch of fabric 13, adhesively secured to the lining 12. Additionally, the lining is provided at each end with a pocket for the reception of a stay or stiffening strip. This pocket is constituted by a piece of thin fabric 14 having a marginal portion 15 folded over and secured by stitching 16. The fabric piece 14 is secured by stitching 17 to the reinforcing patch 13 before the latter is adhered to the collar-top lining 12. It will be observed that although the tubular pocket formed by the folded over portion 15 lies wholly within the area of the collar-top and is directed towards the point of the collar, the piece of fabric 14 is of such size that it extends across the foldline of the collar into the band.

With the plies assembly as described and shown in FIGURE 1, the running stitch 18 is made, securing the superimposed plies together around the major portion of the periphery of the collar, but leaving the back and face plies unattached along the lower edge of the band. The collar is then turned, bringing the two part lining 8, 12 between the face ply 7 and the back ply 6, as shown in FIGURES 3 to 5. After turning, the usual top stitch 19 is applied around the periphery of the collar-top. Either before or after making this stitch, a stay or stiffener 20 is inserted in each of the pockets formed by the fabric pieces 14, and a line of stitching 21 is made parallel to the foldline of the collar, along the zone of overlap of the two parts of the lining, this stitching passing through the five superimposed layers of fabric 7, 8, 9, 12 and 6, thus securing together the two parts 8 and 12 of the interlining in overlapping relation. The stitching 21 also serves to secure at the foldline the pieces of fabric 14, thus retaining permanently in correct position the stiffeners 20.

The two parts 8 and 12 of the lining may be made of similar fabric, but by using two different fabrics for these two parts the band and the collar-top can be given different characteristics while preserving the appearance and manufacturing advantages of a conventional one-piece collar. In particular, a collar with a soft top and a stiffened band may be produced by making the band lining 8 from fabric one or each face of which can be adhered to the adjacent layer of fabric, while the collar-top lining 12 is made of ordinary, non-adhesive fabric. The adhesive content of the band lining may be in the form of a coating applied to a face or to both faces of ordinary fabric, or it may be incorporated in the constituent threads of the fabric itself. Similarly, a collar with a soft band and a stiffened cape may be produced by making the cape lining from such adhesive fabric and the band lining from non-adhesive fabric. In either case, the operations necessary to secure adhesion are carried out after the collar has been turned and the two parts of the lining have been secured together by stitching through their overlapped edges.

The difference in stiffness between the three ply collar-top and the five ply zone over which the two parts of the lining overlap one another is sufficient to predispose the collar to fold along the required line, making the provision of the usual foldline-determining tape unnecessary. However, the precise arrangement of the plies at the zone of overlap may be modified from that illustrated and described above. Thus, the folded over edge 9 of the band lining may be turned under towards the face ply 7, instead of turned away from that ply. The cape lining 12 may be on the face ply side of the band lining, instead of vice versa as shown. Instead of, or in addition to, turning back the edge of the band lining, the lower edge of the collar-top lining 12 may be turned back on itself, this folded margin of the collar-top lining overlapping the upper margin of the band lining. The overlapped edges of the collar-top and band linings may both be left unfolded in cases where the fabrics employed are such that a sufficient difference will be produced by the provision of a four ply zone along the upper edge of the band. While it will generally be convenient to apply the securing stitch 21 through the full thickness of the collar, this stitch may be made through the overlapped lining plies and the back ply only, leaving the face ply unstitched. The securing stitch may be applied at any position across the width of the overlap between the two parts of the lining and the width of this zone of overlap may be increased to any extent desired up to the full width of the band. Where the zone of overlap is of substantial width, two or more lines of securing stitching may be applied at different positions across the width of the zone.

I claim:
1. A method of making a collar having one-piece face and back plies forming a collar top and a collar band and a two-piece lining comprised of a collar-top lining and a collar-band lining, said method comprising the steps of laying one piece of fabric forming the collar-band lining over the band portion of the face ply with one edge of said collar-band lining coinciding with the intended fold line of the collar, stitching an opposite edge of said collar-band lining to said face ply, laying a second piece of fabric forming the collar-top lining over the collar top portion of the face ply so that an edge of said collar-top lining extends across the intended fold line and overlaps said collar-band lining, stitching an edge portion of the superimposed face and back plies and said collar-top lining, turning the assembly to bring the collar-band and the collar-top linings between the outer plies while the overlapping parts of the two lining pieces are still unattached to one another, and thereupon stitching the overlapping lining parts together and to at least one of the outer plies.

2. A method of making a collar as set forth in claim 1 wherein the last step comprises stitching together the overlapping parts of the lining pieces through the full thickness of the collar.

3. A method of making a collar as set forth in claim 1 wherein the first said stitching step comprises stitching said collar-band lining to the face ply along the bottom edge of the collar.

References Cited in the file of this patent

UNITED STATES PATENTS

| 2,165,932 | Panettieri | July 11, 1939 |
| 2,286,510 | Rubinstein | June 16, 1942 |

FOREIGN PATENTS

| 794,588 | Great Britain | May 7, 1958 |